3,380,875
ARTICLE AND METHOD FOR MAKING A BAL-
ANCED PANEL FROM AN UNBALANCED
WOODY CORE
Herbert H. Borup, Concord, Calif., and Ford E. Smith,
Seattle, Wash., assignors to Kaiser Aluminum & Chem-
ical Corporation, Oakland, Calif., a corporation of
Delaware
Filed Feb. 6, 1964, Ser. No. 342,921
12 Claims. (Cl. 161—43)

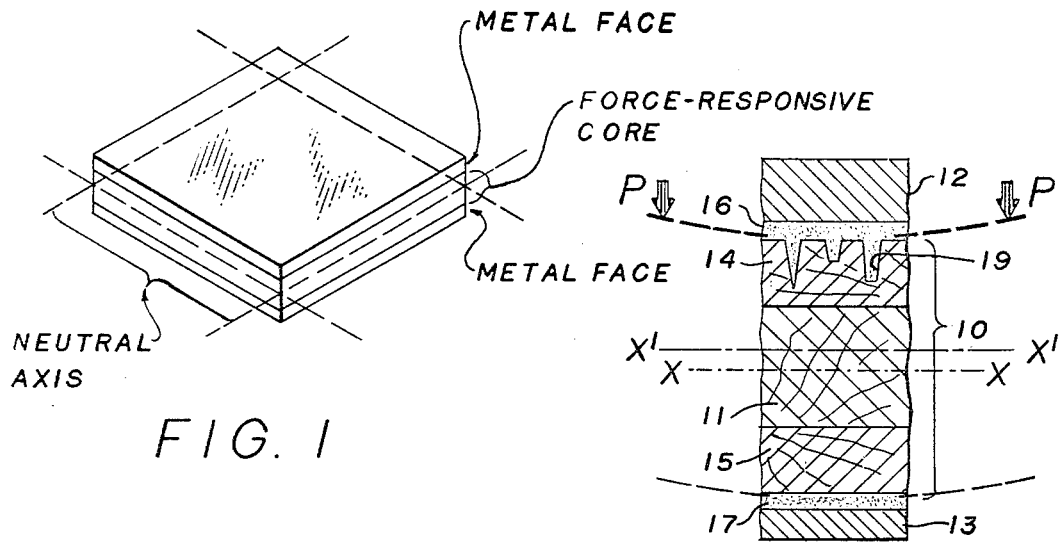
FIG. 1
FIG. 2
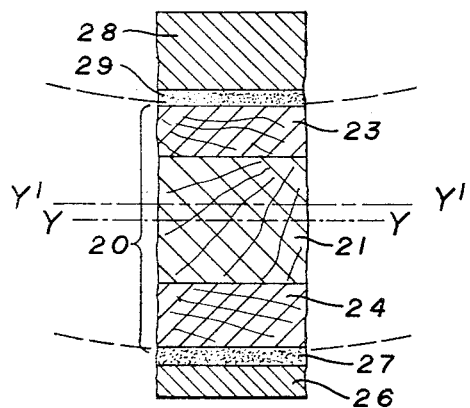
FIG. 3
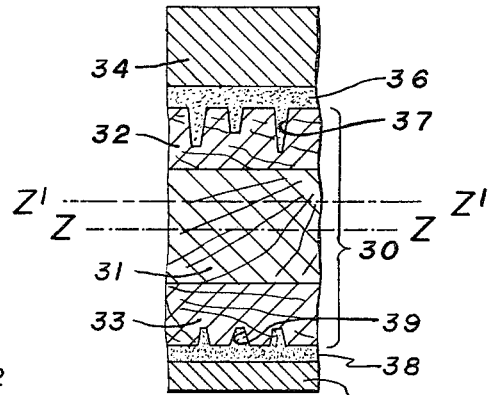
FIG. 4
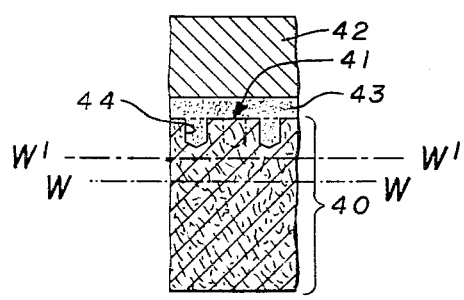
FIG. 5
INVENTORS
HERBERT H. BORUP
FORD E. SMITH
BY James E. Cooney
ATTORNEY United States Patent Office 3,380,875
Patented Apr. 30, 1968

ABSTRACT OF THE DISCLOSURE

Method of producing a stable and metal-overlay lami-
nated panel and the panel produced thereby wherein a
force responsive unbalanced and unstable core has at least
one metallic facing adhesively and non-shiftably bonded
to the core in such fashion that upon setting of the ad-
hesive bond the unbalanced forces acting in the core will
be restrained and controlled by the metallic facing to ef-
fect a stabilizing of the article in a predetermined con-
figuration.

This invention relates to a process of manufacturing
a metal-covered, laminated, composite article and the
product thereof, having a balanced construction and pre-
determined configuration. More particularly, it relates to
a method of producing a metal-covered panel, which,
after manufacture, will maintain a desired configuration
that may be planar or arcuate. This disclosure will specifi-
cally relate the invention with regard to panel production.
However, it will be apparent that it may be readily applied
to laminated articles of other than panel form.

A composite panel can be so constructed whereby it has
one or more metal members non-shiftably attached or
bonded to a suitable core so that either one or both sides
of the core have a metal facing or covering with the metal
members being bonded to the core by means of a suitable
inelastic or rigid adhesive or glue. However, as the metal
members and core usually have different coefficients of
thermal expansion, the various components of the panel
may have non-uniform dimensional movement, for ex-
ample, they may expand and contract in different amounts
when subjected to changing thermal conditions. These
thermal changes can take place during the manufacturing
or bonding process or during use. Where a heat-sensitive
adhesive is used to affix the metal members to the core
and the panel is subjected to an elevated temperature and
then allowed to cool, expansion and contraction forces are
effective, or they can occur in situ, as during or after in-
stallation of the finally fabricated panel in an exposed wall
structure of a building. As a result of these thermal
changes, internal stresses ordinarily develop in the vari-
ous metal components of the panel such that, unless
properly controlled, unbalanced forces will exist between
opposing faces of the core and the metal members and
the panel can undesirably warp or bow until these forces
become balanced and a final state of equilibrium is
reached. The uncontrolled configuration of such a warped
or bowed panel, however, is ordinarily undesirable for
various commercial applications.

Various arrangements for compensating for such ther-
mal changes and for producing a panel of balanced con-
struction and a predetermined configuration are set forth
in the prior applications Ser. No. 234,989, filed Nov. 2,
1962, now United States Patent 3,127,304, and Ser. No.
308,575, filed Sept. 12, 1963, now United States Patent
3,278,355 of Herbert H. Borup. The instant application
represents still another approach to solving the problems
incident to non-uniform dimensional movement of vari-
ous panel components normally caused by the varying
thermal conditions to which they are subjected either
during manufacture or use.

As noted above, the development of internal stresses in
the metal facing of composite panels can occur when a
lay-up or sandwich composed of metal members, such as
aluminum or aluminum alloy facing members and a
force-responsive core, such as a plywood core, is heated
and the metal members are non-shiftably anchored to op-
posing faces of the core while in a thermally expanded
condition. By virtue of having been non-shiftably an-
chored to the core while in a thermally expanded condi-
tion, each metal member is held in restraint upon cooling
of the composite article and stresses are developed.

In another instance, the finished article, such as a panel
having a plywood core to one or more major faces of
which an aluminum or aluminum alloy facing has been
non-shiftably anchored or affixed, is subjected to changing
thermal conditions during use such as when the metal-
faced panel serves as an exterior surface of a building and
is exposed to heat that varies with respect to opposite
faces. In this instance, the metal facing will have been
previously non-shiftably bonded to the core either by
what is referred to in the trade as a rigid glue line formed
by either a hot or cold-setting adhesive. In this latter situa-
tion, the metal members are held in restraint during the
changing thermal conditions whereby internal stresses are
developed in the metal and which, if not controlled or
compensated for, cause non-uniform dimensional move-
ment of the components of the composite article and a
bowing or warping of the article.

Whereas in the prior application Ser. No. 234,989 of
Herbert H. Borup the control of stresses and balancing of
forces applied to opposing faces of a suitable force-respon-
sive core wire primarily effected by the selection and use
of metal overlays having unique structural and functional
relationships as regards thickness and tensile yield
strengths, substantially similar advantageous results can
be obtained by the unique use of an unbalanced core mem-
ber. Thus in general, the present approach to solving the
problem of non-uniform dimensional movement in the
components of a composite laminate due to changes in
the thermal environment of the article either during use
or manufacture involves the selection and use of an ini-
tially deliberately unbalanced or unstable and force-
responsive core member to one or more major faces of
which a metal facing is applied by a suitable inelastic or
non-shiftable adhesive.

When the desired configuration of the finished article
is flat or planar the metal members are non-shiftably
bonded to one or both sides of such an unbalanced core
preferably while the core is restrained or held in an ab-
normally deformed condition.

The metal facings and unbalanced core member are so
selected and the core so anchored to the metal members
whereby internal stresses set up in the metal facings and
in the core member are effectively controlled and the
forces which are applied to the core member by the metal
facings and vice versa are balanced to effect and maintain
the desired configuration of the composite article.

An all-encompassing formula for selection of the metal
facings cannot presently be stated because varying charac-
teristics evidenced by various kinds of woody cores and
varying bonding agents govern the choice of the relative
thicknesses of the two metal coverings. Simply stated,
however, such selection involves a degree of trial and
error well within the skill of the workers in the pertinent
field while taking into consideration factors such as bulky
density, moisture content and unstabilizing and unbal-
ancing forces acting upon the core.

Among the principal objectives of this invention has
been the provision of a process whereby stable laminated
panels may be produced wherein there may be a metal covering on one face only; or where both panel faces are metal covered, the metal covering on one face can have a relatively greater thickness than has the opposite face. It is within the contemplation of the instant invention to provide either planar or arcuate panels having one or both faces metal covered and which are stable in the desired and predetermined configuration. Other objects and advantages will become apparent from a review of the following detailed description when taken in conjunction with the appended drawings, wherein:

FIG. 1 is a schematic perspective view of a laminate made according to this invention;

FIG. 2 is a view of a doubly faced laminate in magnified cross section showing an initially unbalanced force-responsive core in a stabilized balanced condition;

FIG. 3 shows in magnified cross section another doubly faced laminate made according to this invention;

FIG. 4 illustrates a further doubly faced but modified form of laminate produced in accordance with this invention; and FIG. 5 shows in enlarged cross section a singly faced laminate produced according to the instant invention.

Plywood provides an excellent force-responsive core material for use in this invention. Normal plywood, however, is customarily a balanced symmetrical assembly of a plurality of veneers and is designed to normally maintain a planar configuration. For the purposes of this invention, it is desirable to employ a woody laminated core which is so constructed that the resultant product is unbalanced and non-symmetrical in construction. For example, one can assemble veneers in such a fashion that the face veneers are of different relative thicknesses. Thus, the different masses on opposite sides of the center veneer of such a bonded-together assembly result in an unbalanced plywood laminate. The force-responsive core 20 of FIG. 3 is comprised of such an unbalanced plywood assembly. Or, after production, normally balanced plywood may be worked in such manner that it is taken out of balance, i.e., unbalanced facially and made non-symmetrical. In one such instance (see FIG. 2) one face veneer may be relieved as by striating to reduce its mass, but not necessarily its thickness, relative to the mass of the other face to form an unbalanced core 10. Alternatively, both face veneers may be striated or grooved (see FIG. 4), one to such extent as to reduce its mass to less than that of the other to produce core 30. In addition, striations or grooves can be formed in a veneer during peeling of a log by virtue of the fracturing that can occur in the veneer longitudinally of the grain whereby the veneer will have a reduced lateral integrity. Or, after assembly as plywood, one veneer face may be planed or sanded whereby both its mass and its thickness is reduced to less than that of the other veneer face. Core 20 of FIG. 3 is an example of such a structure.

Such unbalanced plywood, unrestrained, will tend to bow or warp across the grain at the faces out of the usually desired planar condition. This tendency is functionally useful for the purposes of the instant invention as will become more apparent from the following descriptions pertinent to the showings of FIGS. 2, 3, and 4. While 3-ply plywood is shown herein as the force-responsive core, it will be understood that plywood of 5-ply, 7-ply, 9-ply, etc., may equally be used to advantage in the practice of the instant invention.

Another example of a suitable unbalanced force-responsive core useful in practicing this invention is shown in FIG. 5. Such a core 40 may comprise a panel of hardboard, particle board, chip board or other reintegrated fibrous board that is normally planar but which has been surface worked on at least one face to such extent that the mass, but not the thickness, on one side of the normal median plane of the panel is less than on the other side. Such working can be accomplished by gang-drilling, gang-sawing or otherwise cutting the face to remove material in a fairly uniform manner. This reduction in the mass of one portion of the core unbalances the core 40 and makes it tend to warp or bow.

It is to be understood that the final product of the process herein may have a predetermined configuration which may be planar or it may be cylindriform concavo-convex. The particular configuration may be accomplished by varying the force-responsiveness of the core of the assembly as by varying the relative thicknesses of the veneer faces; or by varying the relative masses of the veneer faces; or by varying the mass on one side of the normal median plane relative to the mass on the other side. Also, the configuration may be predetermined by non-shiftably bonding a metal covering to one core face and not another; or by interposing and non-shiftably bonding an unbalanced core between a pair of metal coverings of different relative thicknesses which are so selected and arranged as to apply counterbalancing forces on the core to either overcome the tendency due to imbalance to warp or bow, or to stabilize the core in a desirably warped or bowed arcuate configuration.

CONCERNING FIG. 1

The showing in FIG. 1 is purely schematic to show the nature of a preferred form of laminate in which the upper metal face is the thicker relative to the lower metal face. Usually, the upper metal face would be so disposed during use whereby it would suffer the greater exposure as to weather, the elements, etc. In other words, the upper metal face would be the normally exposed face. The force-responsive core between the metal faces is, according to this invention in such assembly, stabilized and balanced, even though, before it and the metal faces were non-shiftably bonded together, it was unstable. The neutral axis shown should in the final product lie approximately medially between the outer faces. However, it need not necessarily be medial of the core.

CONCERNING FIG. 2

FIG. 2 illutsrates a composite doubly faced plywood panel made in accordance with the instant invention and comprising a force-responsive and initially unbalanced plywood core 10 to the opposite major faces of which a pair of metal coverings of overlays 12 and 13 are non-shiftably affixed. In this instance, the outer face veneers 14 and 15 of the core initially had the same thickness, e.g., ⅛″ in the initial as-fabricated state of the core. Faces 14 and 15 are bonded to center ply 11. The mass of veener 14, however, has been reduced by the striations 19, whereas veneer 15 has not been so reduced. This produces an unbalance in the force-responsive core 10.

As used throughout this specification and claims, "force-responsive unbalanced or unstable core" refers to a core member made of rigid, non-collapsible, normally non-contractible materials of a strength and structure capable of resisting forces applied at the major faces thereof by a non-shiftably bonded metal overlay secured thereto and wherein the core in its final as-fabricated state had either a greater average mass or bulk on one side of the broad median axis of the core than on the other side. In the case of a laminated core the median or neutral axis longitudinally and laterally splits the center or innermost ply or veneer, but does not ordinarily coincide with the median plane in the final product. In the case of a re-integrated core 40 such median line splits the panel per se.

The plywood core can be non-shiftably bonded to the metal facings 12 and 13 either by suitable heat-reactive or cold-setting glues or adhesives constituting glue lines 16 and 17. Any heat-reactive adhesive or glue or any cold-setting adhesive or glue, e.g., one which sets at room temperature, that produces a substantially non-elastic or non-shiftable glue line allowing core and overlay to be bonded in an interforce-transmitting relationship is satisfactory. Stated another way, the glue or adhesive should effect such an adherence between the core and an overlay whereby the final product will act as a composite section when subjected to loads during use. Adhesive bonding materials of the type noted above which are suitable may be thermo-setting continuous films of phenol-formaldehyde resin supported on cellulosic carriers which set at elevated temperatures of between 250° and 325° F.; or they may be modified inelastic epoxy resins, neoprene phenolics, casein rubber latex adhesives and neoprene base contact cements.

The metal member or facing 12 can advantageously have a greater relative thickness than member 13. Normally, this would cause the panel 10 to deflect into an arcuate shape, particularly when subjected to varying thermal conditions. The reason for this is set out in detail in the previous applications of Herbert H. Borup, Ser. No. 234,989 and Ser. No. 308,575, noted above. Ordinarily, different unbalanced forces will be applied to the opposing faces of the core 10 by metal members 12 and 13 of different relative thickness when these metal members are held in a restrained or non-shiftably bonded condition. During changing thermal conditions, the force applied to the core by a given metal member under stress is at least in part proportional to thickness of the metal member. To compensate for this normal imbalance of forces, the veneer or ply 14 to which the thicker metal facing 12 is to be affixed is deliberately relieved by being striated, grooved, or gouged-out longitudinally of its grain to reduce its effective mass or bulk to the point that it has less mass or bulk than the opposed veneer or ply 15. Stated another way, the finally as-fabricated core 10 of FIG. 2 is purposely caused to be unbalanced or dimensionally unstable in that it has a greater effective strength below the median axis X—X of core 10, as well as below the median axis X'—X' of the final product than above as shown in FIG. 2. Thus, the less effective face veneer 14 is covered by thicker sheet 12 on the upper side of the article shown in the drawings, and the more effective face veneer 15 is covered by the thinner sheet 13.

The core 10 is in effect deliberately unbalanced by striations 19 provided prior to the application of the metal coverings whereby the application of a thick metal facing to the thin-sided veneer and a thin metal facing to a thick-sided veneer results in a balancing or stabilizing of the core about the axis X'—X' which then becomes the neutral or median axis of the final product. This difference in bulk of the outer plys will, in turn, ordinarily cause the uncovered core to bow or bend across the grain in the manner shown by dotted lines in FIG. 2 because the normal stresses induced in the fibers of the unworked or untreated veneer 15 exceed those present in the debulked veneer 14. During bonding of the metal faces 12 and 13 to core 10 to form a planar article the unbalanced core 10 is preferably forced to assume an abnormal configuration, such as the planar configuration shown in FIG. 1, by the application of pressure thereto in the direction of arrows P—P. After the metal members or facings 12 and 13 are non-shiftably bonded to the core 10 while it is maintained in a deliberately stressed condition, the core 10 tries to relax and to return to its normal unbalanced configuration. In so doing, metal facing members 12 and 13, and in particular facing member 12, are placed in tension. They are thus made to apply preselected equal or balanced forces to opposing sides of the neutral axis X'—X' of the assembly whereby the resultant product will be forced to assume and maintain the desired configuration, which in this instance is planar or flat.

Varying the relative thicknesses of the particular facings 12 and 13 as well as the amount of debulking of lamina 14 produce a preselected configuration of the panel 10. Such variations are readily calculable.

CONCERNING FIG. 3

FIG. 3 discloses a further advantageous embodiment of the instant invention. In this instance, the force-responsive core 20 can suitably be made of non-symmetrical plywood composed of a bonded-together sandwich of a central veneer 21, through which the median axis Y—Y of the core and the median axis Y'—Y' of the final product passes, and outer face veneers 23 and 24 of different relative wood thicknesses. The thicker veneer 24 which can be 1/8" thick can advantageously have a relatively thin metal covering of an aluminum or aluminum alloy foil 26 affixed thereto by glue line 27. The thinner veneer 23, which can be 1/10" thick, can advantageously have a metal covering 28 of aluminum or aluminum alloy sheet affixed thereto by glue line 29. The metal coverings are applied to the core in the same general fashion, as noted above in connection with the description of the article shown in FIG. 2. It is to be understood that in the aluminum industry, the dividing line between sheet and foil is .006". Thus, aluminum and aluminum alloy materials having a gauge or thickness of .006" and above are considered to be "sheet" and aluminum and aluminum alloy materials having a thickness below .006" are considered to be "foil."

By the proper selection of an as-constructed unbalanced core of plywood having wood or other woody veneers of different thickness and the application of metal coverings thereto in a predetermined fashion, the final product configuration can be effectively controlled. In the case of the composite article of FIG. 3, therefore, the thinner core veneer 23 is non-shiftably bonded by glue line 27 to a relatively thick metal overlay 28 while the thicker core veneer 24 is non-shiftably bonded by glue line 29 to the thinner metal overlay or covering 26, all while the core is held in an abnormal deflected condition, as previously described. By appropriate correlation of the thicknesses of the veneers 23 and 24 and of the respective metal coverings 28 and 26, respectively, applied thereto, the ultimate forces applied to opposing sides of the neutral axis Y'—Y' of the final assembly by each of the metal overlays can be adjusted and balanced to give the final panel the desired configuration. Although for most commercial applications, the panel will be desirably planar or flat, as shown, there may be instances where the core will be held in a special deformed position during application of metal facings so selected as to apply calculated forces to the opposing sides of the neutral axis Y'—Y' of the assembly whereby the final panel product will be made to assume a desired concavo-convex cylindriform configuration, as suggested by dotted lines in FIG. 3.

CONCERNING FIG. 4

In FIG. 4, a further embodiment of this invention is shown as a panel which may advantageously comprise plywood core 30 having central core 31 provided with an initial median axis Z—Z and through which the final median axis Z'—Z' of the final product passes. Veneer 31 is sandwiched between outer veneers 32 and 33 which are preferably of substantially the same thickness. However, as shown, both are striated or gouged-out as by striations 37 and 39, respectively, in different amounts as to frequency and/or depth, whereby the veneer 32 to which the thicker metal facing or overlay 34 is adhesively secured by glue line 36 has a smaller relative bulk due to striations 37 than veneer 33, to which the thinner metal facing or overlay 35 is adhesively secured by glue line 38. Thus, the amount of striating of each veneer 32 and 33 can be fully correlated with the thicknesses of the respective metal overlay 34 and 35 applied thereto. An abnormal deflection of the core 30 during bonding to place it in planar condition will result in a panel that will retain a predetermined planar configuration. Or, as before, the resultant panel may be arcuate across the grain of the faces.

CONCERNING FIG. 5

FIG. 5 represents a further desirable embodiment of the invention. It contemplates the use of a homogeneous type of core member 40 made out of hardboard, pressed particle board, chip board, or other reintegrated fibrous board (sawdust or the like). The board face 41 has been relieved as by gang drills of the type used in the manufacture of acoustical tile to produce openings or apertures 44 in the core member which partially penetrate the core. Or, face 41 may be relieved by grooving, striations or other cuts as previously described. The purpose of relief of face 41 as indicated in the drawing is to effect an unbalancing of the core member 40 by allowing the stresses induced in the fibers of the core above or on one side of the axis W—W during manufacture to be less than the stresses induced on the lower or opposing side of the axis W—W of the core by virtue of the separation or stress relief imparted to the first-mentioned fibers. In other words, the core is deliberately unbalanced to such extent that unless restrained it will tend to bow or warp. When, however, metal facing 42 is non-shiftably bonded by glue line 43 to face 41 of the core with the core being held in a flattened or then abnormal condition, the forces applied to the core by the metal covering member and on one side or above neutral axis W—W of the core 40 and median line W'—W' of the final product will be opposed on the other side or below axis W—W and axis W'—W' by similar forces in the core thereby causing the completed panel assembly to finally assume and maintain a predetermined configuration as the stresses induced in core try to relieve themselves and are restrained by the metal covering or facing 42, or vice versa.

It is within the scope of this invention, if desired, to provide a panel with a predetermined bow, in which event metal members or core members of the type set forth above may be properly selected such that they will impart a predetermined bow to the resultant product because the forces exerted between the core and the metal members are deliberately designed to be unbalanced.

While the particular examples set forth refer to the use of aluminum or aluminum alloy metal members and plywood or reintegrated woody cores, such as hardboard cores, it is, of course, obvious that other materials can be used for both the metal skin or face members and/or the core. For example, suitable force-responsive asbestos and plastic cores may be overlaid with stainless steel, aluminum and other metallic materials. By this method, panels can be provided for use in the building trades and in the construction of shipping containers, boats and the lke, in general, wherever a strong composite panel might be desirable. The opposed metal members of a doubly overlaid panel may, of course, also be of quite different materials.

The thicknesses of the various parts shown in the drawing and described herein are merely illustrative and are not to scale. While the present invention has been shown in a few forms only, it will be obvious to those skilled in the art that other assemblies are readily producible and that various changes and modifications may be made in all forms according to this invention without departing from the spirit and scope hereof, as set forth in the appended claims.

We claim:

1. The process of manufacturing a stable composite, laminated article of predetermined configuration, comprising: disposing against a force-responsive unbalanced and unstable woody core; a metal covering member of a character capable, when non-shiftably bonded to said core, of restraining the unbalanced forces acting in said core which impart instability thereto; bringing said core and said metal covering member into adjacent face-to-face relation and interposing a glue line between said adjacent faces of said core and said covering member; forcing said core and covering member into substantially intimate contact for a predetermined period of time, and effecting a setting of said glue line and a bonding of said metal covering member to said core and a controlled stabilizing of said article in said predetermined configuration.

2. The process as set forth in claim 1 including the step of bonding the metal covering member to the core while the core is maintained in a deformed condition.

3. The process of manufacturing a stable composite, laminated article of predetermined configuration, comprising: disposing a force-responsive and unstable woody core consisting of an unbalanced non-symmetrical plywood panel having face veneers of different relative bulks; between a pair of metal covering members of a size coextensive with the size of said plywood panel and having different relative thicknesses; interposing said plywood panel between said metal covering members in such manner that the metal covering member of greater thickness is juxtaposed to the panel face veneer that has the smaller bulk and vice versa; interposing a glue line between said face veneers and the adjacent faces of said covering members; forcing said core and said covering members into substantially intimate contact for a predetermined period of time, effecting a setting of said glue lines and the bonding of said metal covering members to said core and a controlled stabilizing of the article in said predetermined configuration.

4. The process of manufacturing a stable composite laminated panel of predetermined configuration, comprising the steps of forming an unbalanced non-symmetrical, force-responsive plywood panel having one face veneer that is thicker than the opposed face veneer, by assembling a pair of metal covering members of a size coextensive with the face veneers of said plywood panel and having different relative thicknesses, interposing said plywood panel between said pair of covering members in such manner that the thicker face veneer is disposed adjacent the thinner metal covering member and the thinner face veneer is disposed adjacent the thicker metal covering member, interposing adhesive between said plywood panel face veneers and each of said metal covering members and non-shiftably bonding at an elevated temperature said members to said plywood panel and controllably stabilizing said panel in said predetermined configuration.

5. The process of manufacturing a stable composite laminated article of predetermined configuration comprising the steps of providing a force-responsive woody core, removing a predetermined amount of material from at least one of the major faces of the woody core so as to cause the core to become unbalanced and unstable, assembling a sandwich including said unbalanced and unstable core and a pair of opposed metal covering members of different relative thicknesses each extending over and juxtaposed to oppose a separate major face of said core in such fashion that the thicker metal member extends over the face of the core from which a predetermined amount of material has been removed, interposing a glue line between each major face of the unbalanced and unstable core and the adjacent metal covering member and non-shiftably bonding said metal covering members to said core and controllably stabilizing said article in said predetermined configuration.

6. The process as set forth in claim 5 including the step of forcing said unbalanced and unstable core to assume a non-planar configuration during the assembly of said sandwich.

7. The process of manufacturing a stable composite laminated article of predetermined configuration comprising the steps of assembling a force-responsive woody core which has a greater bulk on one side of the neutral axis thereof than on the opposing side of the neutral axis whereby the woody core is unbalanced and unstable; assembling a sandwich including said unbalanced and unstable core and a pair of opposed metal covering members of different relative thicknesses each extending over and juxtaposed to oppose a separate major face of said core and, while assembling said sandwich, applying the thinner metal covering member to the side of the core which has a greater relative bulk on the one side of the neutral axis of the core; applying the thicker metal covering to the side of the core which has the lesser relative bulk on the other side of the neutral axis of the core; interposing a glue line between each major face of the unbalanced and unstable core and the adjacent metal covering member and non-shiftably bonding said metal covering members to said core and controllably stabilizing said article in said predetermined configuration.

8. A stable composite laminated panel of predetermined configuration comprising: a woody core panel having less bulk on one side of the neutral axis paralleling its faces than on the other side of said axis; and a metal covering non-shiftably bonded to said core panel at the face of that portion of the panel having less bulk.

9. A stable composite laminated panel of predetermined configuration comprising: a plywood core panel in which one face veneer thereof has greater bulk than the opposite face veneer of said core panel; each face veneer of said core panel having non-shiftably bonded thereto a metal covering member, the metal covering member bonded to the one face veneer of greater bulk being thinner than the metal covering member bonded to the opposite face veener of said core panel.

10. A stable composite, laminated panel, comprising: a normally unstable and unbalanced plywood core panel having a coextensive metal covering member nonshiftably bonded to each broad face thereof, one of said metal covering members being thicker than the other metal covering member.

11. The panel of claim 8 in which the metal covering is selected from the group consisting of aluminum and aluminum alloys.

12. The panel of claim 9 in which the metal coverings are selected from the group consisting of aluminum and aluminum alloys.

References Cited

UNITED STATES PATENTS

| | | | |
|---|---|---|---|
| 2,479,342 | 8/1949 | Gibbons et al. | 161—39 |
| 2,713,014 | 7/1955 | Johnson | 161—56 |
| 2,514,318 | 7/1950 | Elemendorf | 161—123 |
| 3,127,304 | 3/1964 | Borup | 161—56 |
| 3,278,355 | 10/1966 | Borup | 156—229 |

FOREIGN PATENTS

| | | |
|---|---|---|
| 535,161 | 3/1941 | Great Britain. |

EARL M. BERGERT, *Primary Examiner.*

W. E. HOAG, *Assistant Examiner.*